United States Patent
Joo et al.

(10) Patent No.: US 12,451,791 B2
(45) Date of Patent: Oct. 21, 2025

(54) ELECTRONIC DEVICE AND CONTROL METHOD THEREFOR

(71) Applicant: SAMSUNG ELECTRONICS CO., LTD., Suwon-si (KR)

(72) Inventors: Sungyong Joo, Suwon-si (KR); Sungbum Jung, Suwon-si (KR); Jeongil Kang, Suwon-si (KR); Jongsuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 18/244,984

(22) Filed: Sep. 12, 2023

(65) Prior Publication Data

US 2024/0006977 A1   Jan. 4, 2024

Related U.S. Application Data

(63) Continuation of application No. PCT/KR2022/003419, filed on Mar. 11, 2022.

(30) Foreign Application Priority Data

Apr. 21, 2021   (KR) .................. 10-2021-0051614

(51) Int. Cl.
*H02M 1/00* (2007.01)
*H02M 3/335* (2006.01)

(52) U.S. Cl.
CPC ....... *H02M 1/0032* (2021.05); *H02M 1/0048* (2021.05); *H02M 3/33523* (2013.01)

(58) Field of Classification Search
CPC ............. H02M 1/0032; H02M 1/0048; H02M 3/33523; H02M 1/4225; H02M 3/01;
(Continued)

(56) References Cited

U.S. PATENT DOCUMENTS 5,973,940 A   10/1999   Rehm et al.
6,434,024 B2   8/2002   Shirato
(Continued)

FOREIGN PATENT DOCUMENTS

CN   101489029 A   7/2009
JP   10-146055   5/1998
(Continued)

OTHER PUBLICATIONS

International Search Report dated Jun. 20, 2022 in International Patent Application No. PCT/KR2022/003419.
(Continued)

*Primary Examiner* — Metasebia T Retebo
(74) *Attorney, Agent, or Firm* — STAAS & HALSEY LLP

(57) ABSTRACT

An electronic device comprising: a power supply to supply power; an infrared rays (IR) receiver; a first integrated circuit (IC) to drive the IR receiver based on the power supplied from the supply; and a second IC to supply power to a field-effect transistor (FET), wherein, when a preset control command is received through the IR receiver, the first IC turns on the second IC to drive the FET, which is connected to the second IC and is in a stopped state while the second IC is in a turned-off state, by turning on the second IC to thereby supply power to the electronic device.

13 Claims, 14 Drawing Sheets

(58) Field of Classification Search
CPC ......... H02M 3/33571; H02M 3/33561; H02M 1/0006; H02M 1/007; H02M 1/32; H02J 9/00; H02J 9/005; H02J 2207/50; H03K 17/785; Y02B 70/10

See application file for complete search history.

(56) References Cited

U.S. PATENT DOCUMENTS

| | | | |
|---|---|---|---|
| 9,253,354 | B2 | 2/2016 | Yamamizu |
| 9,444,251 | B2 | 9/2016 | Woo et al. |
| 2002/0000758 | A1 | 1/2002 | Song et al. |
| 2016/0315544 | A1 | 10/2016 | Joo et al. |
| 2016/0359358 | A1* | 12/2016 | Jeong .................. H02J 9/061 |

FOREIGN PATENT DOCUMENTS

| | | |
|---|---|---|
| JP | 2001-352501 | 12/2001 |
| JP | 10-0670587 | 1/2007 |
| JP | WO2019/142417 | 7/2019 |
| JP | 2020-150557 | 9/2020 |
| KR | 0127031 | 3/1996 |
| KR | 10-2009-0123085 | 12/2009 |
| KR | 10-1084540 | 11/2011 |
| KR | 10-2013-0077748 | 7/2013 |
| KR | 10-1440493 | 9/2014 |
| KR | 10-2015-0053242 | 5/2015 |
| KR | 10-2016-0125126 | 10/2016 |
| KR | 10-2020-0064039 | 6/2020 |

OTHER PUBLICATIONS

PCT/ISA/237 dated Jun. 20, 2022 in International Patent Application No. PCT/KR2022/003419.

Korean Office Action issued Apr. 17, 2025 for Application No. 10-2021-0051614.

* cited by examiner

ELECTRONIC DEVICE AND CONTROL METHOD THEREFOR

CROSS-REFERENCE TO RELATED APPLICATION(S)

This application is a continuation application, under 35 U.S.C. § 111(a), of international application No. PCT/KR2022/003419, filed on Mar. 11, 2022, which claims priority under 35 U.S.C. § 119 to Korean Patent Application No. 10-2021-0051614, filed on Apr. 21, 2021, the disclosures of which are incorporated herein by reference in their entireties.

BACKGROUND

Field

The disclosure relates to an electronic device and a control method therefor and, more particularly to, an electronic device supplying power and a control method therefor.

Description of the Related Art

Development of electronic technology has led to development of various types of devices, and particularly, a display device like a television, a monitor, a digital signage, or the like, has been developed in a diverse manner.

A display device may operate in a standby mode to minimize power consumption while not being used. Even in this case, a minimum circuit for receiving a turn-on command and the like is operated by a user, and power consumption for minimum circuit operation is generated.

In detail, as shown in FIG. 1A, a flyback controller in a flyback structure may continuously perform a switching operation in a normal mode, but may not perform a switching operation during a predetermined time interval in a standby mode. That is, a time interval during which the switching operation is performed and a time interval in which the switching operation is not performed are repeated in the standby mode. An LLC of the power supply device of the PFC/LLC structure of FIG. 1B is also operated similar to the flyback controller in the flyback structure.

That is, in the standby mode, power consumption is not problematic in an interval in which a switching operation is not performed, but power is consumed in an interval for performing a switching operation, so a method for minimizing power consumption needs to be developed.

SUMMARY

According to one or more embodiments of the disclosure, an electronic device includes a power supply to supply power, an infrared rays (IR) receiver, a first integrated circuit (IC) to drive the IR receiver based on the power supplied from the power supply, and a second IC to supply power to a field effect transistor (FET), and based on a preset control command being received through the first IR receiver, the first IC may drive the FET, which is connected to the second IC and is in a stopped state while the second IC is in a turned-off state, by turning on the second IC to thereby supply power to the electronic device.

The power supply may supply power to the first IC through a first output terminal, and supply power to the electronic device through a second output terminal connected to the first output terminal through a relay.

Based on receiving the preset control command, the first IC may supply power to the electronic device through the second output terminal through short-circuit of the relay.

The second IC may include a first terminal to receive power output through the first output terminal, a second terminal to output power based on the received power to the first IC, a third terminal to receive a turn-on command from the first IC, and a fourth terminal and a fifth terminal configured to output a switching signal according to the turn-on command, and the second IC, in the turned-off state, may output power of a first level to the first IC, and the second IC, in a turned-on state, output power of a second level greater than the first level to the first IC.

The power supply may include a first capacitor charged during a half cycle of alternating current power and discharged during a remaining half cycle, a second capacitor discharged during the half cycle and charged during the remaining half cycle, and a current limiter configured to cut off the AC power during the remaining half cycle.

The first IC may receive power based on power charged to the second capacitor during the half cycle, and may receive power based on power charged to the first capacitor during the remaining half cycle.

The power supply may include a first capacitor configured to limit output of AC power, and a voltage detector to operate based on magnitude of power supplied to the first IC.

The capacitor may be a first capacitor and the electronic device may further include a second capacitor connectable parallel with the voltage detector, the voltage detector may, based on the magnitude of the power supplied to the first IC being greater than or equal to a threshold magnitude, cut off current to the second capacitor, and based on the magnitude of the power supplied to the first IC being less than the threshold magnitude, operate to charge the second capacitor.

The IR receiver may be a first IR receiver and the electronic device may further include a second IR receiver, and the electronic device may, based on the power being supplied to the electronic device, drive the second IR receiver, and operate based on a control command received through the second IR receiver.

The first IC may supply power to the electronic device by turning on the second IC by a preset cycle.

The first IC may consume less power than the second IC.

A method of controlling an electronic device according to one or more embodiments includes supplying power by a power supply, driving an infrared rays (IR) receiver, by a first IC, based on the power supplied from the power supply, and based on a preset control command being received through the IR receiver, driving a field effect transistor (FET) connected to a second IC and is in a stopped state while the second IC is in a turned-off state, by turning on, by the first IC, the second IC to thereby supply power to the electronic device, and the FET may be in a stopped state based on the second IC being turned off.

The driving may include supplying, by the power supply, power to the first IC through a first output terminal, and the power to the electronic device may be supplied through a second output terminal connected to the first output terminal through a relay.

The power to the electronic device may be supplied through the second output terminal through short-circuit of the relay by the first IC.

The driving of the IR receiver may include receiving, by the second IC, power output through the first output terminal, outputting, in the turned-off state, power of a first level based on the received power to the first IC, and the supplying of the power to the electronic device may include receiving, by the second IC, a turn-on command from the first IC, outputting power of a second level greater than the first level to the first IC based on the received power, and supplying power to the electronic device by outputting a switching signal.

The supplying of power may include charging a first capacitor during a half cycle of alternating current power and discharged during a remaining half cycle, discharging a second capacitor during the half cycle and charged during the remaining half cycle, cutting off the AC power through a current limiter of the power supply, discharging the first capacitor, and charging the second capacitor during the remaining half cycle.

The discharging the second capacitor includes receiving by the first IC, power based on power charged to the second capacitor during the half cycle, and the charging the second capacitor may include receiving power, by the first IC, based on power charged to the first capacitor during the remaining half cycle.

The supplying of power may include limiting output of AC power through the first capacitor included in the power supply.

The supplying of power may include, based on the magnitude of the power supplied to the first IC being greater than or equal to a threshold magnitude, cutting off, by the voltage detector included in the power supply, current to the second capacitor connectable parallel to the voltage detector, and based on the magnitude of the power supplied to the first IC being less than the threshold magnitude, charging the second capacitor.

The method may further include, based on the power being supplied to the electronic device, driving the second IR receiver of the electronic device, and operating the electronic device based on a control command received through the second IR receiver.

BRIEF DESCRIPTION OF DRAWINGS

The above and/or other aspects of the disclosure will be more apparent by describing certain embodiments of the disclosure with reference to the accompanying drawings, in which.

DETAILED DESCRIPTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In the following description, a "user" may refer to a person using an electronic apparatus or an artificial intelligence electronic apparatus using an electronic apparatus (e.g., artificial intelligence electronic apparatus).

The disclosure is designed to improve the above-described problem, and the purpose of the disclosure is to provide an electronic device to minimize power consumption in a standby mode and a control method therefor.

According to various embodiments of the disclosure as described above, since only a first integrated circuit (IC) consumes power in a standby mode, the electronic device may minimize power consumption in a standby mode.

The electronic device may further include a circuit using only half cycle of alternating current (AC) to further reduce power consumption of first IC.

The first IC of the electronic device may recover an oxide film of a capacitor by periodically turning on a second IC to supply power to the electronic device, thereby improving lifespan of a capacitor.

An embodiment of the disclosure will be described in more detail with reference to the accompanying drawings.

Figure 1A:
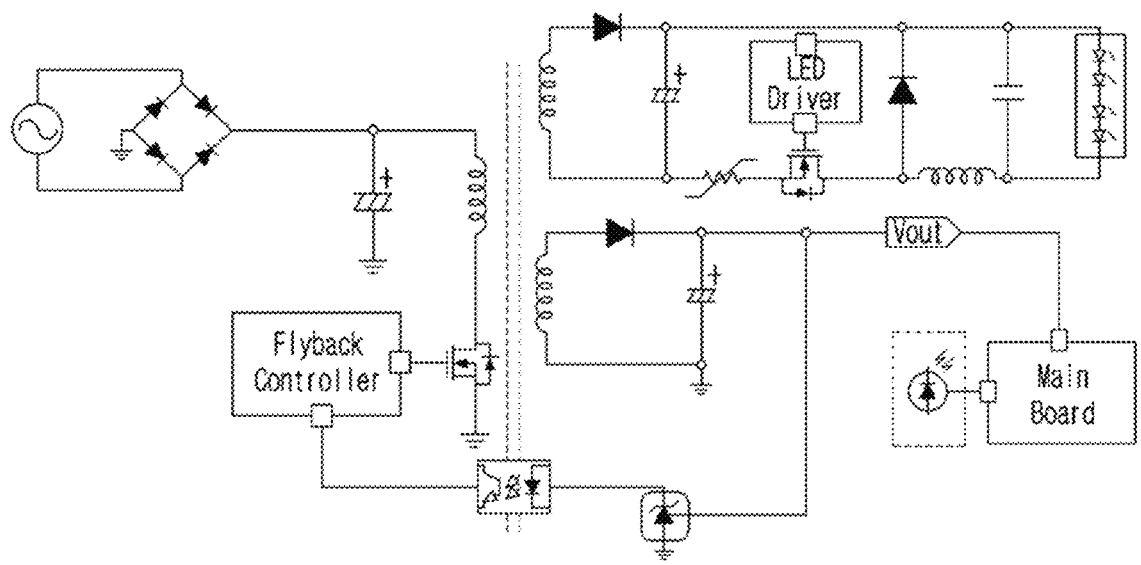
FIGS. 1A and 1B are diagrams illustrating power consumption in a standby mode according to the related-art.
Figure 1B:
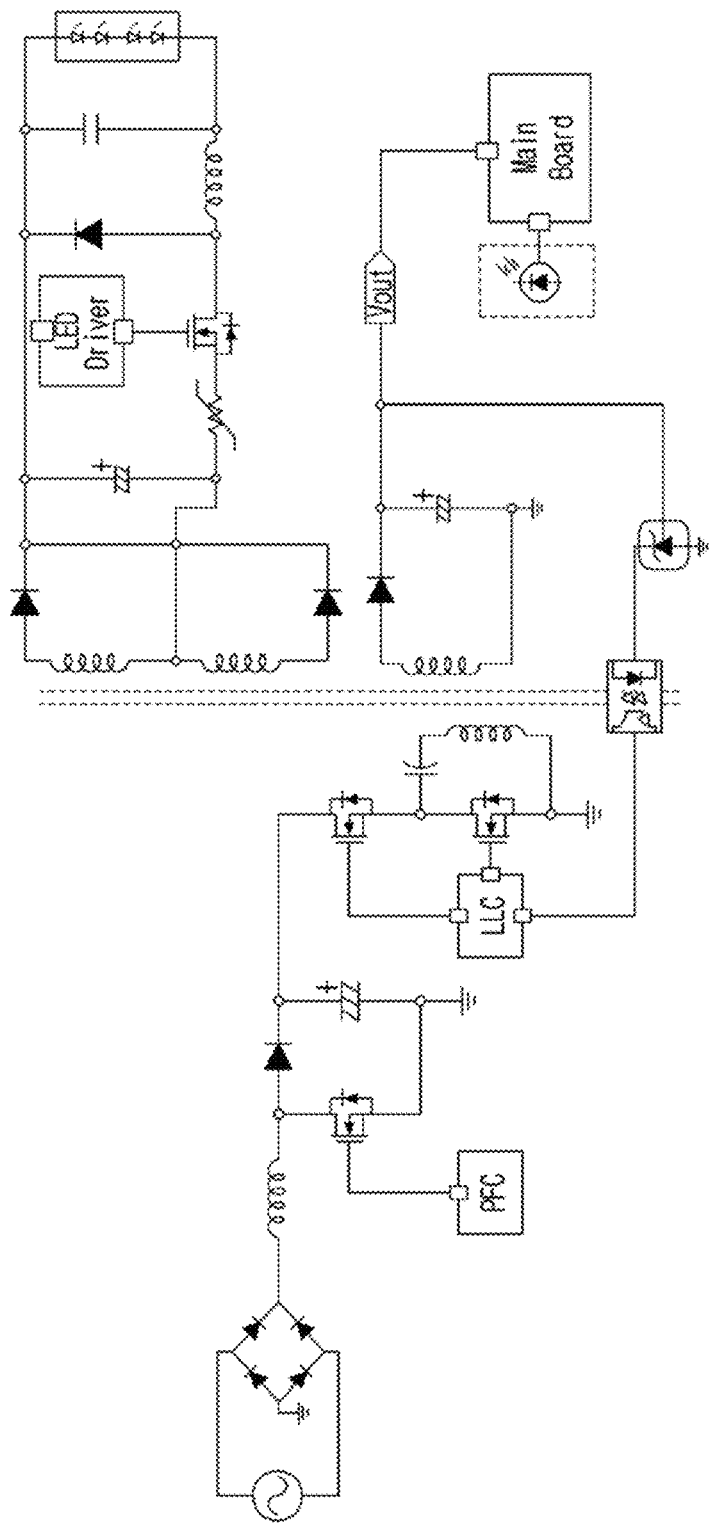
Figure 2:
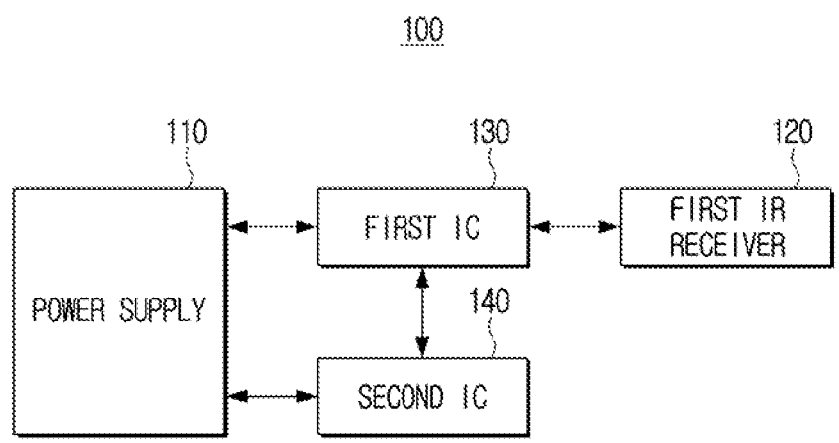
FIG. 2 is a block diagram illustrating a configuration of an electronic device according to one or more embodiments of the disclosure.

FIG. 2 is a block diagram illustrating a configuration of the electronic device 100 according to one or more embodiments of the disclosure. As illustrated in FIG. 2, the electronic device 100 may include a power supply 110, a first infrared rays (IR) receiver 120, a first integrated circuit (IC) 130, and a second IC.

The electronic device 100 may be any device including a power supply 110 and capable of operating in one of a plurality of modes. For example, the electronic device 100 may be a TV, a monitor, a desktop PC, a laptop computer, a smart phone, a tablet personal computer (PC), a set-top box (STB), a server, a BD player, a disk player, a steaming box, and the like. The electronic device 100 may operate in a normal mode or in a standby mode.

Alternatively, the electronic device 100 may be a part for supplying power in the entire device. For example, the electronic device 100 may be a part excepting a display or the like in the display device and a part for supplying power to the display device.

The electronic device 100 may be a device to supply power to a plurality of other electronic devices.

The power supply 110 may generate power and may provide the power to at least one of the first IC or the second IC.

The first IR receiver 120 may receive power from the power supply 110 through the first IC 130 and receive a control command for controlling the electronic device 100 or a device including the electronic device 100. Here, the control command may be an infrared (IR) communication type signal.

The first IC 130 may drive the first IR receiver based on the power supplied from the power supply 110. In addition, when a preset control command is received through the first IR receiver 120, the first IC 130 may turn on the second IC 140 to drive a field effect transistor (FET) connected to the second IC 140 to supply power to the electronic device 100. For example, when a control command for turning on the electronic device 100 or a device including the electronic device 100 is received through the first IR receiver 120, the first IC 130 may supply power to the electronic device 100 by turning on the second IC 140 to drive the FET.

Here, the first IC 130 may have less power consumption than the second IC 140. For example, the first IC 130 may be implemented as a Micom, and the second IC 140 may be implemented as a flyback controller or LLC. Also, the FET may be in a stopped state when the second IC is turned off.

The second IC 140 may supply power to the FET. The second IC 140 may supply power to the electronic device 100 or the entire device including the electronic device 100 by driving the FET. For example, the second IC 140 may supply power to the electronic device 100 or the entire device including the electronic device 100 by driving the FET through a switching operation.

That is, in a standby mode such as before the second IC 140 is turned on by the first IC 130, the first IR receiver 120 and the first IC 130 consume power, and power consumption is smaller in the first IC 130 than that of the second IC 140, power consumption is reduced compared to the related art. In addition, since the FET does not operate, power consumption is reduced compared to the related art.

The power supply 110 may provide power to the first IC 130 through the first output terminal and may provide power to the electronic device 100 through the second output terminal connected to the first output terminal through a relay.

Here, the relay is open, but when a preset control command is received, the first IC 130 may short-circuit the relay to supply power to the electronic device 100 through the second output terminal. That is, in the standby mode, the electronic device 100 connected to the power supply 110 through the second output terminal may be in a state of not physically supplying power and thus may prevent standby power consumption. The above relay is an embodiment, an SCR (thyristor) may be implemented instead of a relay, and any component capable of physically releasing connection is available.

In the meantime, the second IC 140 may include a first terminal for receiving power output through the first output terminal, a second terminal for outputting power based on the received power source to the first IC 130, a third terminal for receiving a turn-on command from the first IC 130, and a fourth terminal and a fifth terminal for outputting a switching signal according to the turn-on command. When the second IC 140 is in the turn-off state, the second IC 140 may output the power of the first level to the first IC 130, and when the second IC 140 is in the turn-on state, the second IC 140 may output the power of the second level, which is greater than the first level, to the first IC 130. That is, when the second IC 140 is in the turn-off state, the first IC 130 may be supplied with power through the second IC 140, but the second IC 140 is not turned on so the power consumption of the second IC 140 may be ignored.

Alternatively, the power supply 110 may include a first capacitor charged during a half cycle of the AC power and discharged during the remaining half cycle, a second capacitor discharged during the half cycle and charged during the remaining half cycle, and a current limiter for cutting off the alternating current power during the remaining half cycle.

In this case, the first IC 130 may be supplied with power based on the power charged in the second capacitor during the half cycle, and may be supplied with power based on the power charged in the first capacitor during the remaining half cycle. Through this operation, the first IC 130 may be operated only by power consumption only during a half cycle.

The power supply 110 may include a capacitor for limiting output of AC power and a voltage detector operating based on magnitude of power supplied to the first IC 130.

A capacitor connected to the voltage detector in parallel may be further included, and the voltage detector included in the power supply 110) may block current to the capacitor, when the volume of power supplied to the first IC 130 is greater than or equal to a threshold magnitude, and if the magnitude of power supplied to the first IC 130 is less than threshold magnitude, the voltage detector included in the power supply 110) may operate to charge the capacitor. Through this operation, minimum power may be supplied to the first IC 130.

The electronic device 100 may further include a second IR receiver, and the electronic device 100 may operate the second IR receiver when power is supplied to the electronic device, and operate based on a control command received through the second IR receiver. That is, in the standby mode, the electronic device 100 operates based on the control command received from the first IR receiver 120, but in the normal mode, the electronic device 100 may operate based on the control command received from the second IR receiver. In particular, in the normal mode, the first IC 130 may not supply power to the first IR receiver 120.

The first IC 130 may supply power to the first electronic device 100 by turning on the second IC 140 in a preset cycle. Through this operation, the oxide film of the capacitor may be recovered and thereby the lifespan of the capacitor may be improved.

The operation of the electronic device 100 will be described in more detail below with reference to FIGS. 3 to 12. In FIGS. 3 to 12, an individual embodiment will be described for convenience of description. However, the individual embodiments of FIGS. 3 to 12 may be performed in a combined state.

Figure 3:
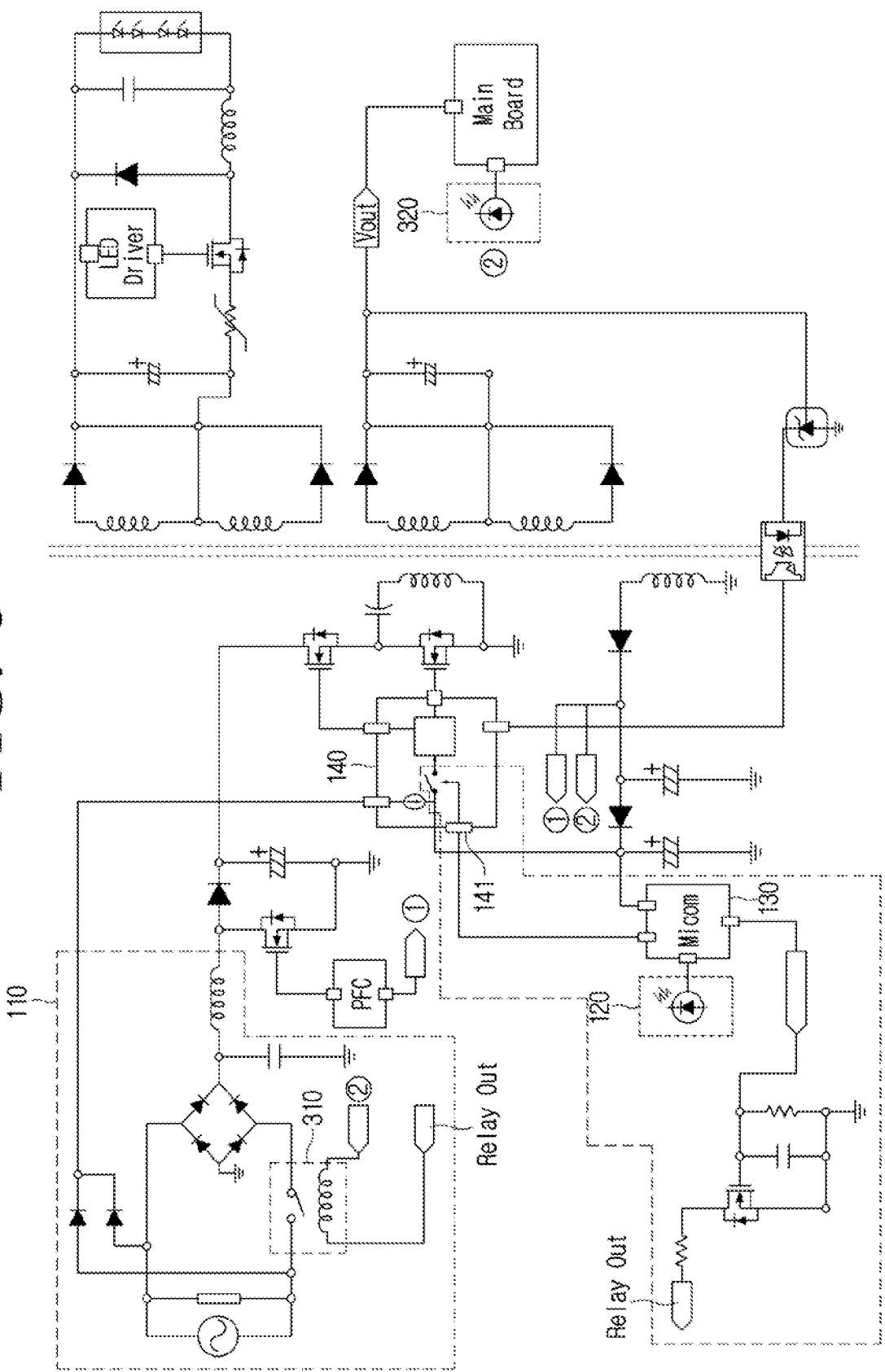
FIG. 3 is a diagram illustrating a circuit configuration of an electronic device according to one or more embodiments of the disclosure.

FIG. 3 is a diagram illustrating a circuit configuration of the electronic device 100 according to one or more embodiments of the disclosure.

When the electronic device 100 or the device including the electronic device 100 is in a standby mode, the relay 310 may be in an open state. That is, the power supply 110 may output power to only the bridge diode and the left node of the relay 310, may not supply power to the circuit connected to the right side of the bridge diode, and the cut-off is physical cut-off, so there is no consumption of power.

The power supply 110 may provide power output from the left node of the bridge diode and the relay 310 to the first IC 130 network through a second IC (LLC) 140. Specifically, the second IC 140 may receive power through the upper left terminal and provide power of a first level to a right top terminal of the first IC 130.

The first IC 130 may drive the first IR receiver 120 through the left terminal of the first IC 130 based on the power supplied from the power supply 110. That is, in the standby mode, the first IR receiver 120 and the first IC 130 are main components for consuming power. In particular, the first IC 130 is configured to identify only whether a preset control command is received from the first IR receiver 120, and thus may further reduce power consumption than a related art flyback controller or LLC. Here, the preset control command may be a command for turning on the electronic device 100 or a device including the electronic device 100.

When a preset control command is received through the first IR receiver 120, the first IC 130 may transmit a wakeup signal to the second IC 140 through the left upper terminal of the first IC 130. In addition, the first IC 130 may short-circuit the relay 310 through a lower terminal of the first IC 130.

When the wake-up signal is received through the left terminal 141, the switch inside the second IC 140 is short-circuited, and the power supplied through the upper left terminal is provided to the PWM IC inside the second IC 140, and the PWM IC may perform a switching operation. At the same time, the relay 310 is short-circuited, and power may be supplied to a circuit connected to the right of the bridge diode. Power may be supplied to the electronic device 100 through the operation. In addition, when the second IC 140 is changed to the turn-on state, the second IC 140 may output a second level of power, which is greater than the first level, to the first IC 130 based on the received power.

When power is supplied to the electronic device 100, power is supplied to the second IR receiver 320, and the electronic device 100 may operate based on a control command received through the second IR receiver 320.

In the standby mode as described above, power consumption may be physically limited through the relay 310. For example, switching loss, core loss, EL_Cap leakage, F/B leakage, bias current of the remaining ICs except for the first IC 130, and the like may be fundamentally cut off.

In the meantime, only the first IR receiver 120 has been described in FIG. 3, but the embodiment is not limited thereto. For example, the electronic device 100 or a device including the electronic device 100 may further include a physical button, and when a preset control command is received through the button, the electronic device 100 may turn on the second IC 140.

The second IC LLC 140 of FIG. 3 is also different from the related-art LLC. Specifically, the second IC LLC, 140 of FIG. 3 may further include a path for supplying power to the first IC 130 and a terminal for receiving a wake-up signal compared to a related-art LLC.

Figure 4:
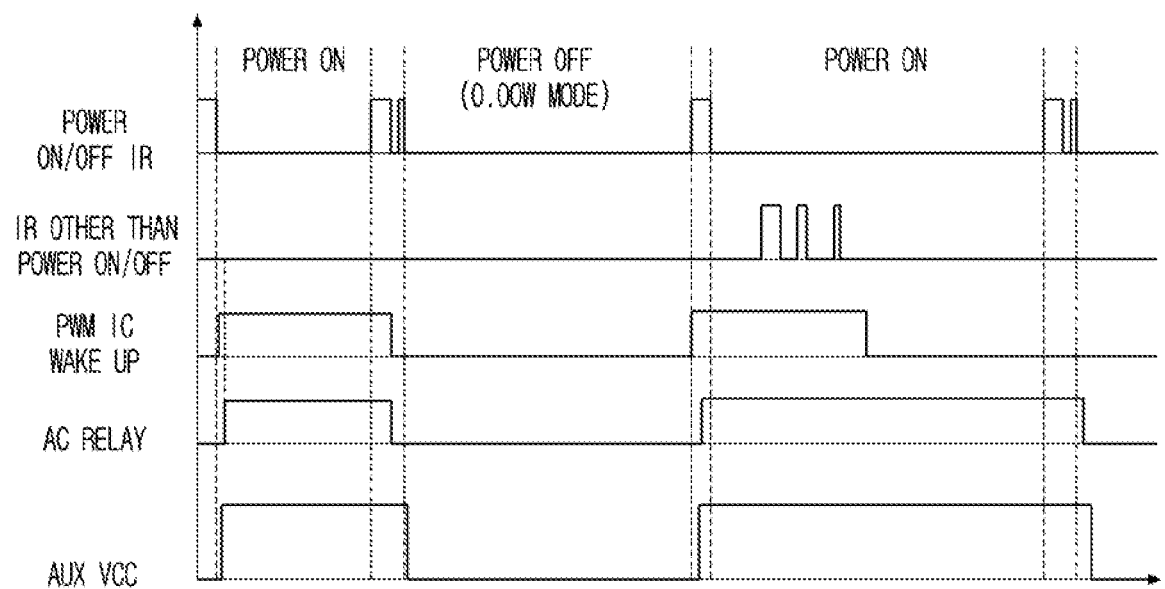
FIG. 4 is a diagram illustrating power consumption according to one or more embodiments of the disclosure.

FIG. 4 is a diagram illustrating power consumption according to one or more embodiments of the disclosure.

If the electronic device 100 or a device including the electronic device 100 is turned on according to a power on IR signal of FIG. 4, the PWM IC inside the second IC 140 may be turned on and a relay may be short-circuited, so that power may be supplied to the secondary side.

Thereafter, when the electronic device 100 or a device including the electronic device 100 is turned off according to the power-off IR signal, the PWM IC inside the second IC 140 may be turned off, and the relay is opened so that power to the secondary side may be cut off. At this time, power consumption may be reduced due to physical cut-off by the relay.

Figure 5:
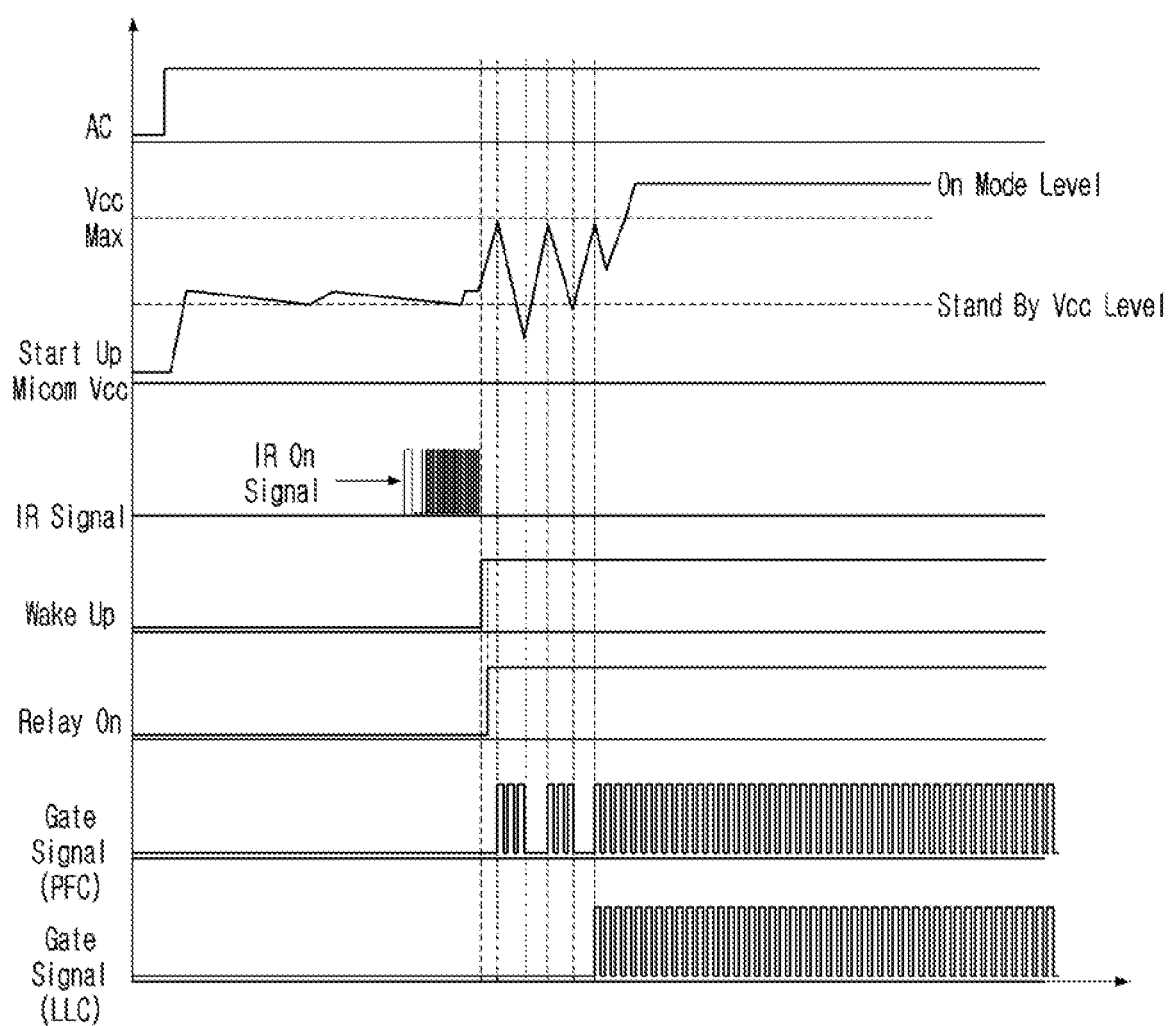
FIG. 5 is a diagram illustrating timing of each signal according to one or more embodiments of the disclosure.

FIG. 5 is a diagram illustrating timing of each signal according to one or more embodiments of the disclosure.

First, the first IC (Micom, 130) may be controlled to a Vcc value of two stages. For example, when AC power is applied, a 1-step Vcc voltage of 3-4 V level is provided to the first IC 130, and the first IC 130 may minimize power consumption in the standby mode. That is, there is no switching operation of the second IC 140, thereby power consumption may be reduced compared to the related art.

When a turn-on signal (IR on signal) is received, a 2-step Vcc voltage higher than the 1-step Vcc voltage is provided to the first IC 130, and the first IC 130 may short-circuit (relay on) the relay and turn on (wake up) the second IC 140. Accordingly, the PFC and the LLC are operated.

Figure 6:
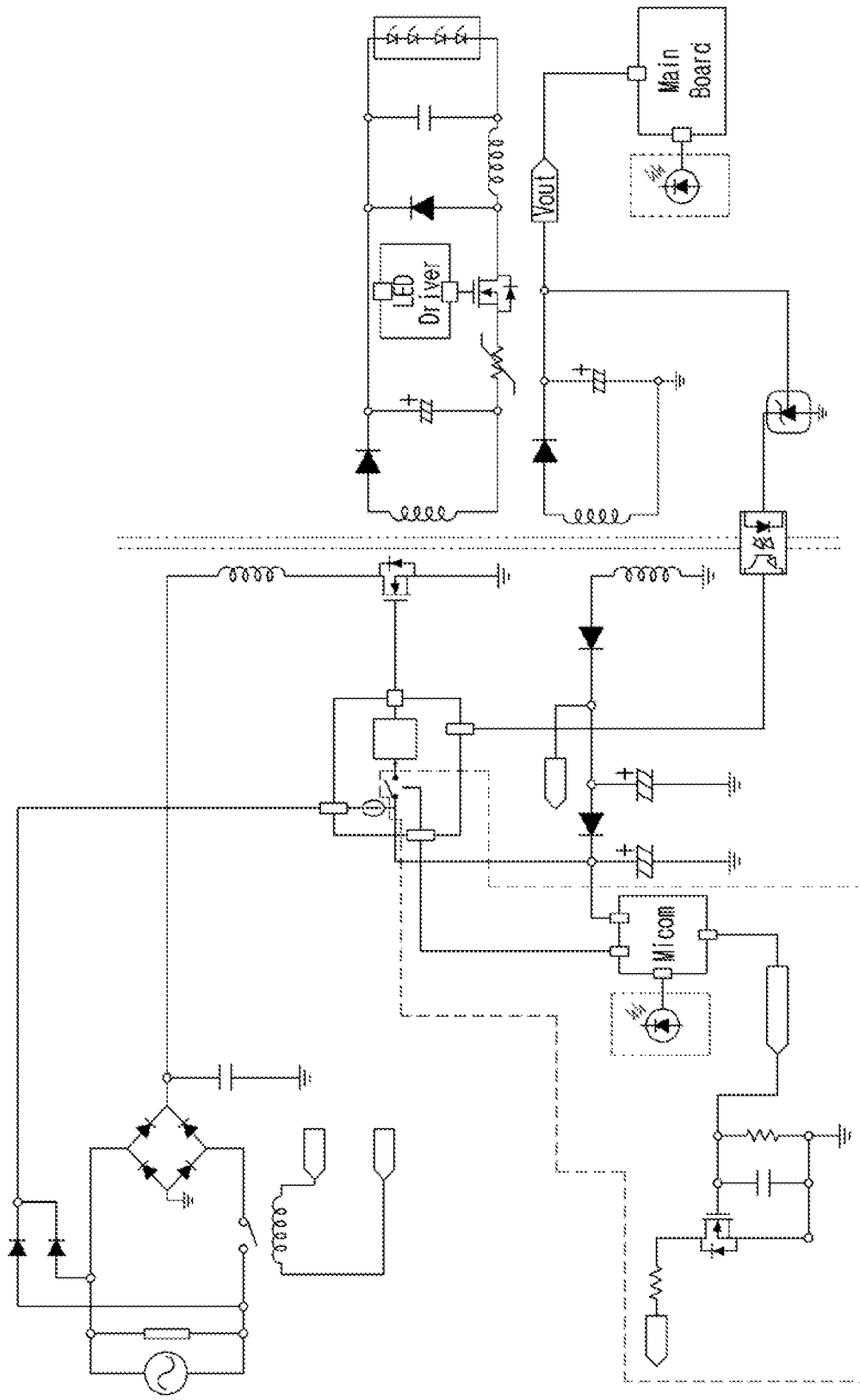
FIG. 6 is a diagram illustrating a circuit configuration of an electronic device according to another embodiment of the disclosure.

FIG. 6 is a diagram illustrating a circuit configuration of the electronic device 100 according to another embodiment of the disclosure.

FIG. 3 assumes a diagram to which the disclosure is added in the PFC/LLC structure, and FIG. 6 assumes a diagram to which the disclosure is added in a flyback structure. In FIG. 3, other than that the operation of turning on the second IC (LLC, 140) by the first IC (Micom, 130) is changed to the operation of turning on the second IC (flyback controller, 140) by the first IC (Micom, 130) in FIG. 6, the operation of FIG. 6 is the same as the operation of FIG. 3, and thus a redundant description is omitted.

In the meantime, the second IC (Flyback controller, 140) of FIG. 6 is different from a related-art flyback controller. Specifically, the second IC (Flyback controller) 140 of FIG. 6 may further include a path and a terminal for receiving a wake-up signal and a path for supplying power to the first IC 130 compared to a related-art flyback controller.

Figure 7:
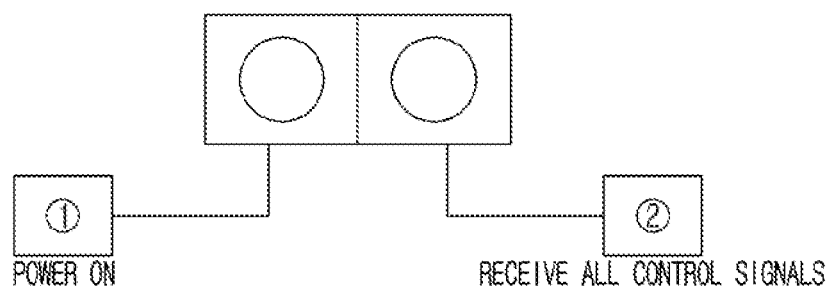
FIG. 7 is a diagram illustrating a plurality of IR receivers according to one or more embodiments of the disclosure.

FIG. 7 is a diagram illustrating a plurality of IR receivers according to one or more embodiments of the disclosure.

As shown in FIG. 7, the electronic device 100 may include the first IR receiver 120 and the second IR receiver. The first IR receiver 120 is configured to receive a turn-on command in a standby mode, and the second IR receiver may be configured to receive all types of control signals in a normal mode.

The first IR receiver 120 may receive the primary side power and thus may be connected by a reinforced insulation cable.

Hereinabove, a method of standby power reduction using the first IC 130, relay, or the like, in the standby mode has been described. Hereinbelow, a method of reducing standby power will be described.

Figure 8:
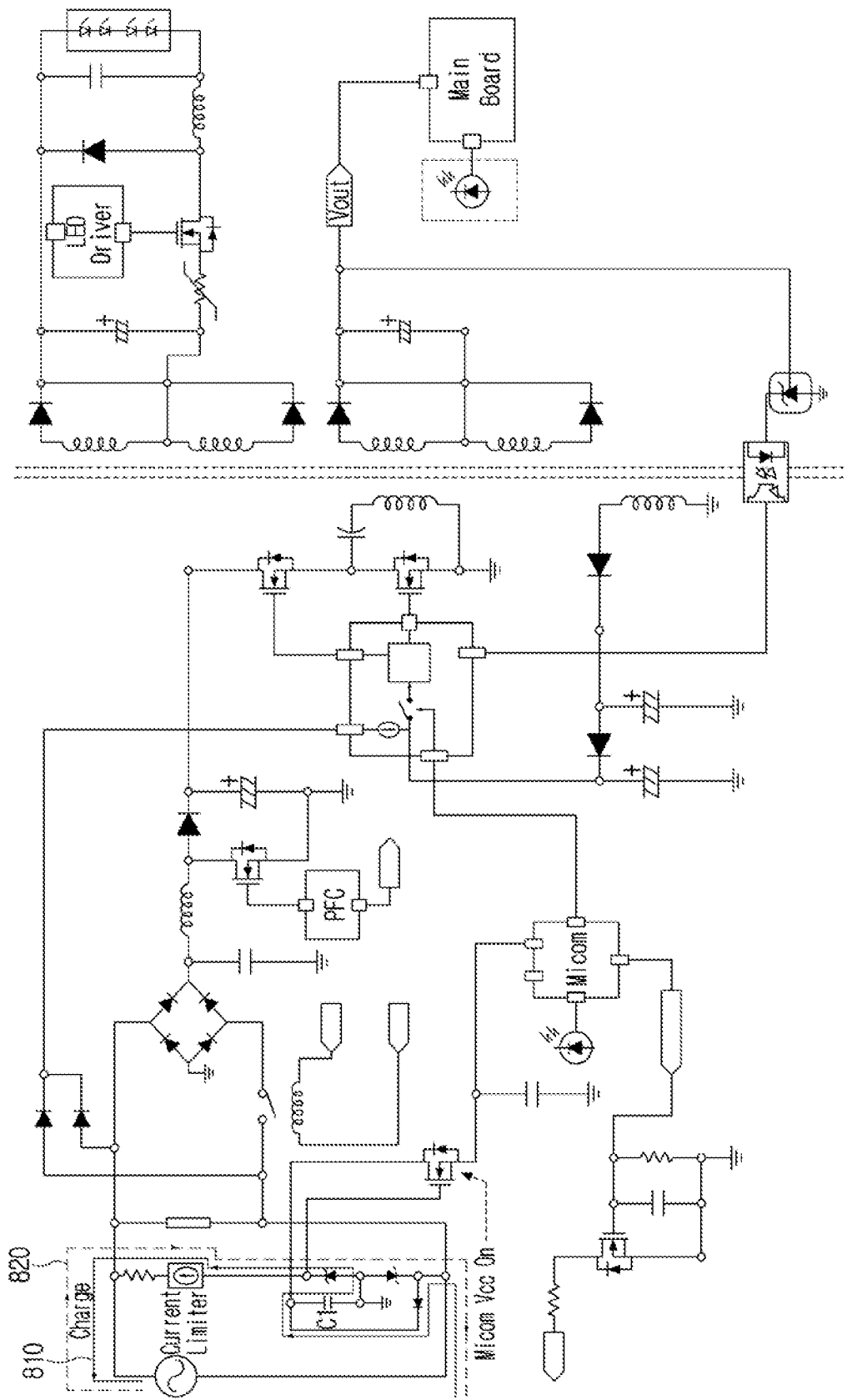
FIG. 8 is a diagram illustrating a method for reducing standby power according to another embodiment of the disclosure.

FIG. 8 is a diagram illustrating a method for reducing standby power according to another embodiment of the disclosure.

Referring to FIG. 8, the first IC 130 may directly receiver power from the power supply 110, not through the second IC 140. At this time, the power supply 110 may further include the first capacitor C1, the second capacitor, diode, resistance, Zener diode, and a current limiter.

The current flows in the same direction as 810 during the half cycle of the AC power source, and the first capacitor may be charged. Current flow in the same direction as 820 is blocked by the current limiter during the remaining half cycle of the AC power source, and the first capacitor may be discharged.

Here, Micom Vcc On FET is turned off during semi cycle, and the second capacitor connected to the right upper terminal of the first IC 130 may be discharged. During the remaining half cycle, Micom Vcc On FET may be turned on, and the second capacitor may be charged by the first capacitor.

The first IC 130 may receive power based on power charged to the second capacitor during the half cycle, and may receive power based on power charged to the first capacitor during the remaining half cycle.

That is, the first IC 130 may be driven during the remaining half cycle by charging during the half cycle, and standby power may be minimized.

Figure 9:
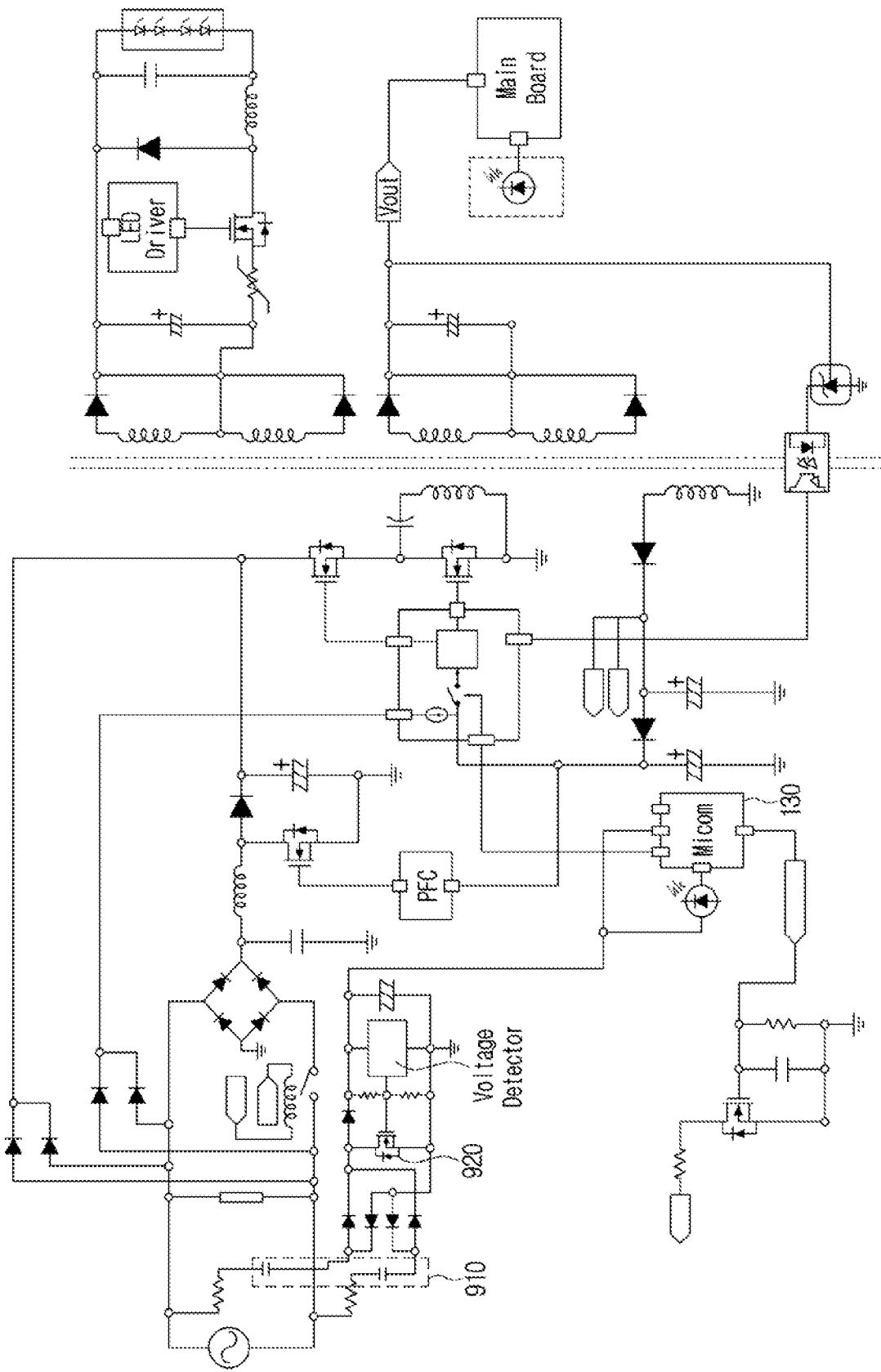
FIGS. 9 and 10 are diagrams illustrating a method for reducing standby power according to another embodiment of the disclosure.
Figure 10:
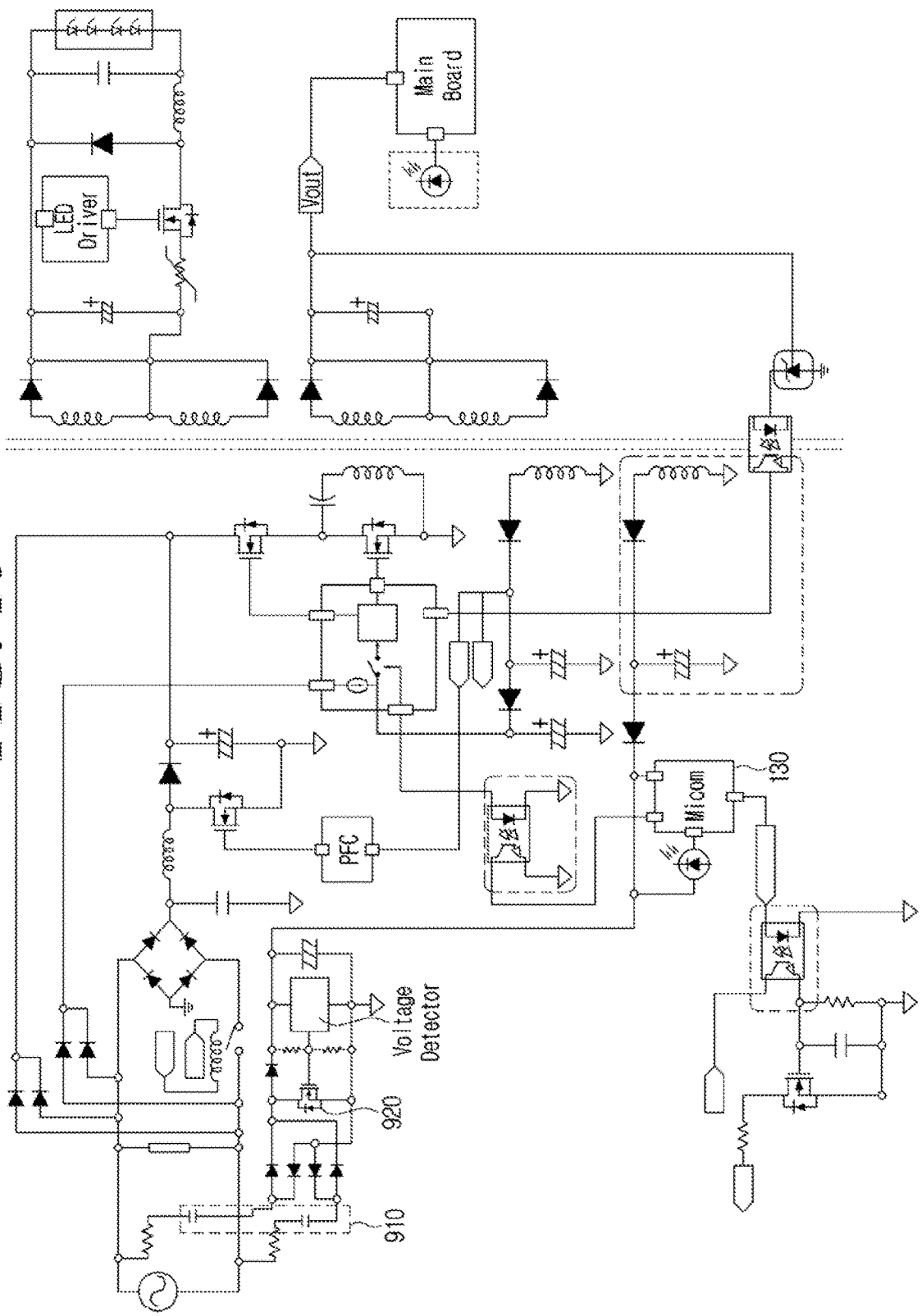

FIGS. 9 and 10 are diagrams illustrating a method for reducing standby power according to another embodiment of the disclosure.

In FIG. 9, the first IC 130 may directly receive power from the power supply 110 rather than through the second IC 140. The power supply 110 may further include a first capacitor, a resistor, a bridge diode, a second capacitor, a diode, and a voltage detector.

The power supply 110 may include a first capacitor 910 and a resistor for limiting the output of an AC power source. When the output of the AC power is increased, the circuit may be blocked by the first capacitor to reduce power consumption.

The power supply 110 may further include a voltage detector operating based on a magnitude of power supplied to the first IC 130 and a second capacitor connected in parallel with the voltage detector. The voltage detector may cut off a current to the second capacitor when the magnitude of the power supplied to the first IC 130 is greater than or equal to a threshold magnitude. In this case, the FET connected to the output terminal of the bridge diode is turned on and used as a current path. The voltage detector may be operated to charge the second capacitor when the size of the power supplied to the first IC 130 cell is less than the threshold size.

In FIGS. 8 and 9, the PFC/LLC structure is described as an example, but flyback is applicable in the same manner.

Alternatively, as illustrated in FIG. 10, the primary side grounding of the circuit in FIG. 9 may be changed to a floating grounding and the primary side and the secondary side may be divided to remove standby power increase amount for the return path current.

Figure 11:
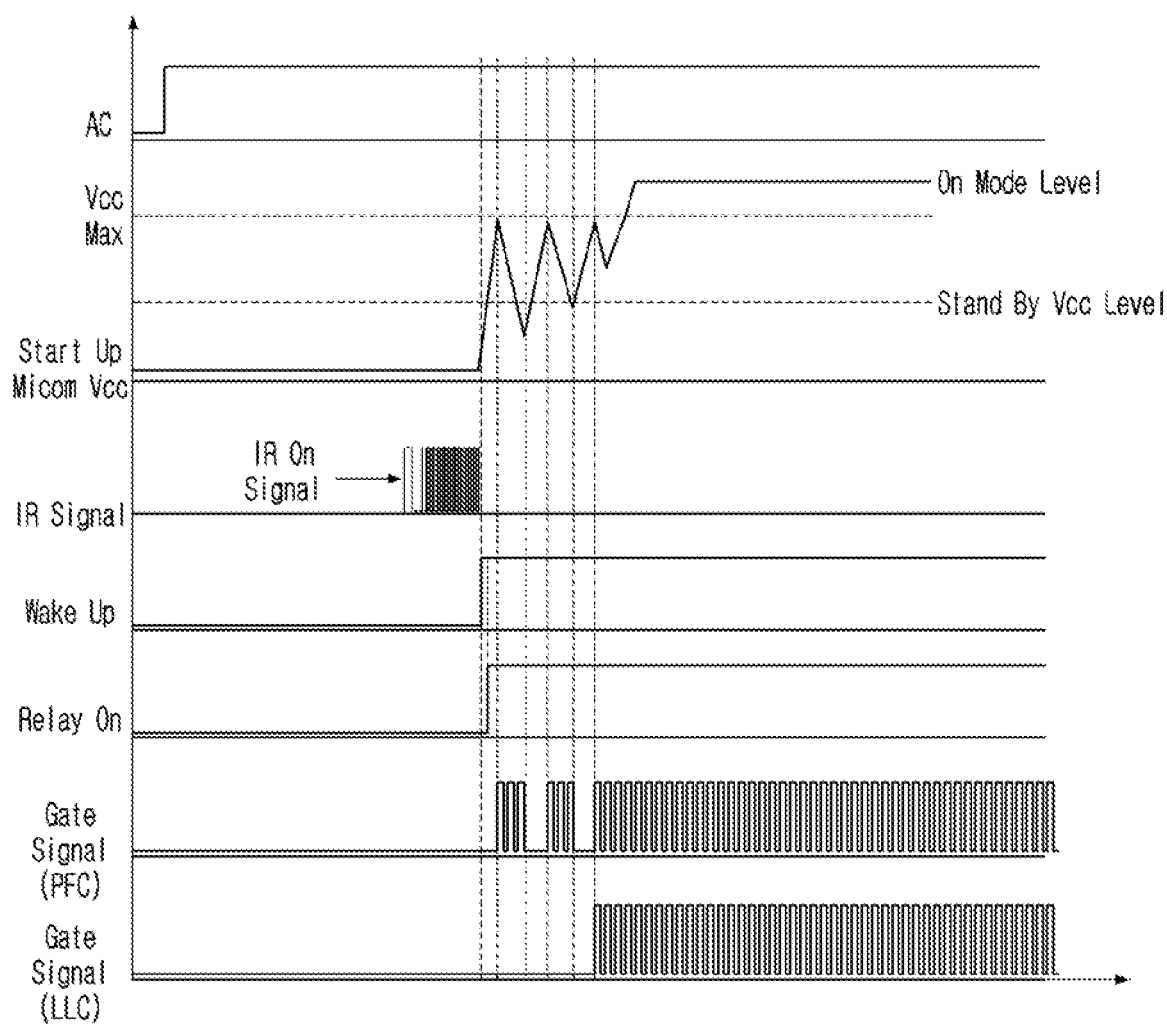
FIG. 11 is a diagram illustrating timing of each signal according to another embodiment of the disclosure.

FIG. 11 is a diagram illustrating timing of each signal according to another embodiment of the disclosure.

FIG. 11 illustrates timing of each signal corresponding to the embodiment of FIG. 10 and is mostly similar to FIG. 5, but there is a difference in that power consumption in the standby mode before input of the IR on signal is further reduced.

Specifically, as described with reference to FIGS. 9 and 10, the voltage detector may charge/discharge a capacitor according to the size of power supplied to the first IC 130. That is, the voltage detector supplies only the minimum power required for driving to the first IC 130, thereby reducing power consumption in the standby mode than the embodiment of FIG. 3.

Figure 12:
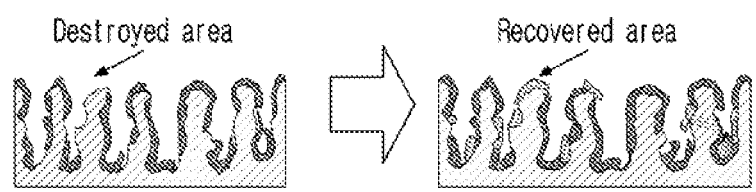
FIG. 12 is a diagram illustrating an operation of a first IC according to one or more embodiments of the disclosure.

FIG. 12 is a diagram illustrating an operation of the first IC 130 according to one or more embodiments of the disclosure.

If the standby mode continues for a long period of time, the oxide film of an electrolytic capacitor may be damaged, and leaked current is increasing, substantially causing shortage of lifespan of a power board.

The first IC 130 may supply power to the electronic device 100 by turning on the second IC 140 by a preset cycle. For example, when the standby mode continues for a threshold time or more, the first IC 130 may turn on the second IC 140 to supply power to the electronic device 100. Through this operation, the lifespan of a product may be improved by performing a self-healing function of a part having an electrolyte.

Figure 13:
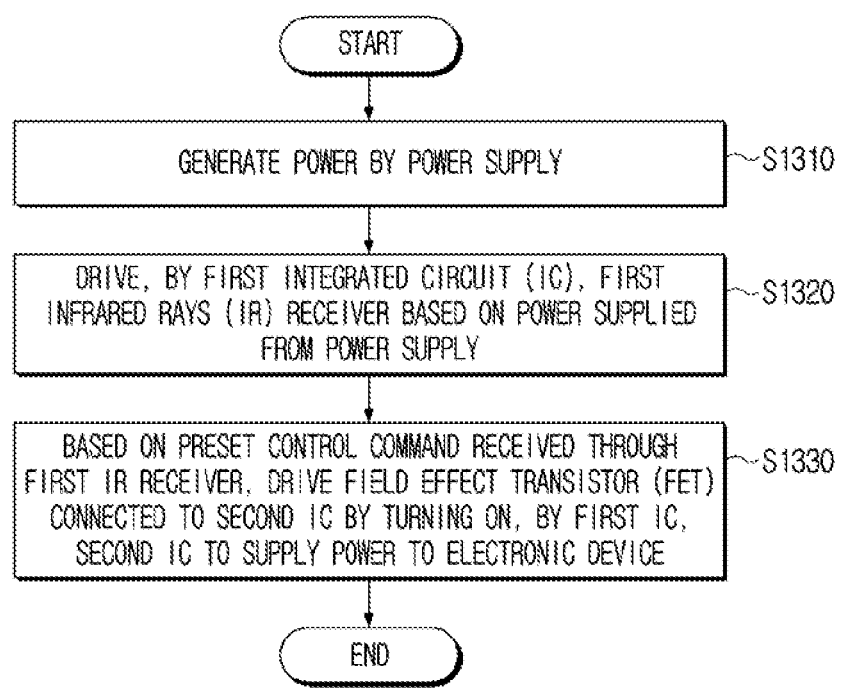
FIG. 13 is a flowchart illustrating a method for controlling an electronic device according to one or more embodiments of the disclosure.

FIG. 13 is a flowchart illustrating a method for controlling an electronic device according to one or more embodiments of the disclosure.

The power supply generates power in operation S1310. Then, the first IC drives the first IR receiver based on the power supplied from the power supply in operation S1320. Based on a preset control command being received through the first IR receiver, by driving a field effect transistor (FET) connected to the second IC by turning on, by the first IC, the second IC, power is supplied to the electronic device in operation S1330. Here, the FET is in a stopped state based on the second IC being turned off.

The driving in operation S1320 may include supplying, by the power supply, power to the first IC through a first output terminal and the supplying in operation S1330 may include supplying power to the electronic device through a second output terminal connected to the first output terminal through a relay.

The supplying in operation S1330 may include supplying power to the electronic device through the second output terminal through short-circuit of the relay by the first IC, based on receiving a preset control command.

The driving in operation S1320 may include receiving, by the second IC, power output through the first output terminal, outputting, in a turned-off state, power of a first level based on the received power to the first IC, and the supplying in operation S1330 may include receiving, by the second IC, a turn-on command from the first IC, outputting power of a second level greater than the first level to the first IC based on the received power, and supplying power to the electronic device by outputting a switching signal.

The method generating in operation S1310 may include charging a first capacitor of a power supply during a half cycle of an AC power supply and discharging a second capacitor of the power supply unit and cutting off AC power through a current limiter of the power supply and discharging the first capacitor and charging a second capacitor during the remaining half cycle.

Here, the operation of discharging the second capacitor receives power based on the power charged in the second capacitor during the half cycle of the first IC, and the operation of charging the second capacitor may be supplied with power based on the power charged in the first capacitor during a half cycle in which the first IC discharges.

The generating in operation S1310 may include limiting output of AC power through the first capacitor included in the power supply.

The generating in operation S1310 may further include blocking, by a voltage detector included in the power supply, a current to a second capacitor connected in parallel to the voltage detector when the magnitude of the power supplied to the first IC is greater than or equal to a threshold magnitude, and charging the second capacitor when the magnitude of the power supplied to the first IC is less than the threshold size.

The method may further include driving the second IR receiver of the electronic device when power is supplied to the electronic device, and operating the electronic device based on the control command received through the second IR receiver.

According to various embodiments of the disclosure as described above, since only a first integrated circuit (IC) consumes power in a standby mode, the electronic device may minimize power consumption in a standby mode.

Alternatively, the electronic device may further include a circuit using only the half cycle of AC power and may further reduce power consumption of the first IC.

The first IC of the electronic device periodically turns on the second IC to supply power to the electronic device, thereby restoring the oxide film of the capacitor to improve the lifespan of the capacitor.

The embodiments of the disclosure may be implemented as software that includes instructions stored in machine-readable storage media readable by a machine (e.g., a computer). A device may call instructions from a storage medium and that is operable in accordance with the called instructions, including an electronic apparatus (e.g., the electronic device A). When the instruction is executed by a processor, the processor may perform the function corresponding to the instruction, either directly or under the control of the processor, using other components. The instructions may include a code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

According to embodiments, a method disclosed herein may be provided in a computer program product. A computer program product may be traded between a seller and a purchaser as a commodity. A computer program product may be distributed in the form of a machine readable storage medium (e.g., CD-ROM) or distributed online through an application store (e.g., PlayStore™). In the case of on-line distribution, at least a portion of the computer program product may be stored temporarily or at least temporarily in a storage medium such as a manufacturer's server, a server in an application store, or a memory in a relay server.

Also, in accordance with one embodiment of the disclosure, the various embodiments described above may be embodied as computer-readable codes on a computer or similar device using software, hardware, or may be implemented in a recording medium. In some cases, the embodiments described herein may be implemented by the processor itself. According to a software implementation, embodiments such as the procedures and functions described herein may be implemented in separate software modules. Each of the software modules may perform one or more of the functions and operations described herein.

Computer instructions for performing the processing operations of a device according to various embodiments described above may be stored in a non-transitory computer-readable medium. The computer instructions stored in the non-volatile computer-readable medium cause a particular device to perform a processing operation on the device according to various embodiments described above when executed by a processor of the particular device. Non-transitory computer readable media is a medium that stores data and is readable by the device. Specific examples of non-transitory computer readable media include CD, DVD, hard disk, Blu-ray disk, USB, memory card, ROM, etc.

Each of the components (for example, a module or a program) according to the embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments, may be performed sequentially, in a parallel, repetitive, or heuristic manner, or at least some operations may be performed in a different order, omitted, or other operations can be added.

Hereinabove, although the embodiments of the disclosure have been shown and described, it should be understood that the disclosure is not limited to the disclosed embodiments and may be variously modified without departing from the spirit and the scope of the disclosure. Therefore, the modifications should not be understood separately from the technical spirit or scope of the disclosure.

What is claimed is:

1. An electronic device comprising:
   a power supply to supply power;
   an infrared rays (IR) receiver;
   a first integrated circuit (IC) to drive the IR receiver based on power supplied from the power supply; and
   a second IC to supply power to a field effect transistor (FET),
   wherein, based on a preset control command being received through the IR receiver, the first IC drives the FET, which is connected to the second IC and is in a stopped state while the second IC is in a turned-off state, by turning on the second IC to thereby supply power to the electronic device,
   wherein the power supply is configured to:
      supply power to the first IC through a first output terminal, and
      supply power to the electronic device through a second output terminal connected to the first output terminal through a relay.

2. The electronic device of claim 1, wherein the first IC is configured to, based on receiving the preset control command, supply power to the electronic device through the second output terminal through short-circuit of the relay.

3. The electronic device of claim 1, wherein the second IC comprises:
   a first terminal to receive power output through the first output terminal;
   a second terminal to output power based on the received power to the first IC;
   a third terminal to receive a turn-on command from the first IC; and
   a fourth terminal and a fifth terminal configured to output a switching signal according to the turn-on command,
   wherein the second IC, in the turned-off state, outputs power of a first level to the first IC, and the second IC, in a turned-on state, outputs power of a second level greater than the first level to the first IC.

4. The electronic device of claim 1, wherein the power supply comprises:
   a first capacitor charged during a half cycle of alternating current power and discharged during a remaining half cycle;

a second capacitor discharged during the half cycle and charged during the remaining half cycle; and
a current limiter configured to cut off alternating current (AC) power during the remaining half cycle.

5. The electronic device of claim 4, wherein the first IC is configured to receive power based on power charged to the second capacitor during the half cycle, and
receive power based on power charged to the first capacitor during the remaining half cycle.

6. The electronic device of claim 1, wherein the power supply comprises:
a capacitor configured to limit output of AC power; and
a voltage detector to operate based on magnitude of power supplied to the first IC.

7. The electronic device of claim 6, wherein the capacitor is a first capacitor and the electronic device further comprises:
a second capacitor connectable parallel with the voltage detector,
wherein the voltage detector is configured to:
based on the magnitude of the power supplied to the first IC being greater than or equal to a threshold magnitude, cut off current to the second capacitor, and
based on the magnitude of the power supplied to the first IC being less than the threshold magnitude, operate to charge the second capacitor.

8. The electronic device of claim 1, wherein the IR receiver is a first IR receiver and the electronic device further comprises:
a second IR receiver,
wherein the electronic device is configured to:
based on the power being supplied to the electronic device, drive the second IR receiver, and
operate based on a control command received through the second IR receiver.

9. The electronic device of claim 1, wherein the first IC supplies power to the electronic device by turning on the second IC by a preset cycle.

10. The electronic device of claim 1, wherein the first IC consumes less power than the second IC.

11. A method of controlling an electronic device, the method comprising:
suppling power by a power supply;
driving an infrared rays (IR) receiver, by a first IC, based on the power supplied from the power supply; and
based on a preset control command being received through the IR receiver, driving a field effect transistor (FET) connected to a second IC and is in a stopped state while the second IC is in a turned-off state, by turning on, by the first IC, the second IC to thereby supply power to the electronic device,
wherein the driving of the IR receiver comprises supplying, by the power supply, power to the first IC through a first output terminal,
wherein the power to the electronic device is supplied through a second output terminal connected to the first output terminal through a relay.

12. The method of claim 11, wherein the power to the electronic device is supplied through the second output terminal through short-circuit of the relay by the first IC.

13. The method of claim 11, wherein the driving of the IR receiver comprises receiving, by the second IC, the power output through the first output terminal, outputting, in the turned-off state, power of a first level based on the received power to the first IC,
wherein the supplying of the power to the electronic device comprises receiving, by the second IC, a turn-on command from the first IC, outputting power of a second level greater than the first level to the first IC based on the received power, and supplying the power to the electronic device by outputting a switching signal.

* * * * *